(12) United States Patent
Praharaj et al.

(10) Patent No.: US 12,009,998 B1
(45) Date of Patent: Jun. 11, 2024

(54) CORE NETWORK SUPPORT FOR APPLICATION REQUESTED NETWORK SERVICE LEVEL OBJECTIVES

(71) Applicant: Cisco Technology, Inc., San Jose, CA (US)

(72) Inventors: Saswat Praharaj, Pleasanton, CA (US); Fabio R. Maino, Palo Alto, CA (US); Alberto Rodriguez Natal, Leon (ES); Pradeep Kumar Kathail, Los Altos, CA (US); Bruce McDougall, Anacortes, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/202,080

(22) Filed: May 25, 2023

(51) Int. Cl.
*H04L 41/5019* (2022.01)
*H04L 12/46* (2006.01)

(52) U.S. Cl.
CPC ...... *H04L 41/5019* (2013.01); *H04L 12/4633* (2013.01)

(58) Field of Classification Search
CPC .................. H04L 41/5019; H04L 12/4633
See application file for complete search history.

(56) References Cited

U.S. PATENT DOCUMENTS

| | | | |
|---|---|---|---|
| 1,144,487 A | 6/1915 | McGinley | |
| 10,355,989 B1* | 7/2019 | Panchal | H04L 45/586 |
| 10,547,511 B2* | 1/2020 | Ellis | H04L 41/122 |
| 10,567,252 B1* | 2/2020 | Mukhopadhyaya | H04L 43/0805 |
| 10,742,721 B1* | 8/2020 | Wagner | H04L 67/10 |
| 11,381,474 B1* | 7/2022 | Kumar | H04L 41/0896 |
| 11,516,049 B2* | 11/2022 | Cidon | H04L 12/4633 |
| 11,563,601 B1* | 1/2023 | K S | H04L 41/0816 |
| 11,582,137 B1* | 2/2023 | Tian | H04L 12/4633 |
| 11,606,225 B2* | 3/2023 | Cidon | H04L 41/0894 |
| 11,637,753 B1* | 4/2023 | Wang | H04L 41/147 709/223 |

(Continued)

FOREIGN PATENT DOCUMENTS

EP 2892183 8/2017

*Primary Examiner* — Blake J Rubin
(74) *Attorney, Agent, or Firm* — Lee & Hayes P.C.

(57) ABSTRACT

Techniques for informing a network of an application's service-level agreement (SLA) objective(s) so the network can ensure the SLA is met end-to-end, thereby allowing core network support of deterministic SLA and application-based routing without using network-based application recognition (NBAR) and/or compromising user privacy. The techniques may include receiving a first connection request to establish a network-domain connection between different network domains that meets or exceeds a service level objective. Based on the first connection request, the network-domain connection may be established between the different network domains to meet or exceed the service-level objective. In some examples, a second connection request may be received to establish a tunnel between a source application and a destination application, which are disposed in the different network domains. Based on the second connection request, the techniques may include establishing the tunnel between the source application and the destination application utilizing the network-domain connection.

20 Claims, 7 Drawing Sheets

(56) References Cited

U.S. PATENT DOCUMENTS

| | | | |
|---|---|---|---|
| 11,729,062 B1* | 8/2023 | Daw | H04L 41/0897 |
| | | | 709/224 |
| 2015/0281099 A1 | 10/2015 | Banavalikar | |
| 2017/0279710 A1* | 9/2017 | Khan | H04L 45/748 |
| 2018/0343146 A1* | 11/2018 | Dunbar | H04L 45/50 |
| 2019/0386918 A1* | 12/2019 | Iyer | H04L 43/0829 |
| 2020/0275357 A1* | 8/2020 | Bordeleau | H04L 41/40 |
| 2020/0382387 A1* | 12/2020 | Pasupathy | H04L 45/123 |
| 2021/0168125 A1* | 6/2021 | Vemulpali | H04L 9/0825 |
| 2021/0288881 A1 | 9/2021 | Zhang | |
| 2021/0336880 A1* | 10/2021 | Gupta | H04L 41/5019 |
| 2021/0360083 A1* | 11/2021 | Duggal | H04L 67/34 |
| 2021/0377185 A1* | 12/2021 | Durrani | H04L 47/823 |
| 2022/0217015 A1 | 7/2022 | Vuggrala et al. | |
| 2022/0345374 A1* | 10/2022 | Venkata | H04L 41/40 |
| 2023/0156826 A1* | 5/2023 | Palermo | H04W 76/10 |
| | | | 370/329 |
| 2023/0224246 A1* | 7/2023 | Saavedra | H04L 45/22 |
| | | | 370/389 |
| 2023/0275833 A1* | 8/2023 | Hyun | H04L 47/00 |
| | | | 370/389 |

\* cited by examiner

CORE NETWORK SUPPORT FOR APPLICATION REQUESTED NETWORK SERVICE LEVEL OBJECTIVES

TECHNICAL FIELD

The present disclosure relates generally to, among other things, control plane signaling techniques for informing a network of an application's service-level agreement (SLA) objective(s) so that the network can ensure the SLA is met end-to-end, thereby allowing core network support of deterministic SLA and application-based routing without using network-based application recognition (NBAR) and/or compromising user privacy.

BACKGROUND

Modern applications deployed by enterprise IT typically have access requirements of external websites, internal services hosted in a different geographical location, and/or other software as a service (SaaS) applications. As such, network operations teams usually try to optimally configure internal and external networks so that the network can meet application service-level agreement (SLA) objectives. In today's software-defined wide area network (SD-WAN) deployments, this is typically done using, for instance, traffic-profile and/or destination-based optimization techniques. However, because these optimization techniques do not allow applications to communicate their SLA objective(s) to the network, these optimization techniques can only do non-deterministic, best-effort optimization, and there is no way for network behavior (loss, latency, etc.) to be mapped to application behavior (performance).

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

OVERVIEW

Figure 1:
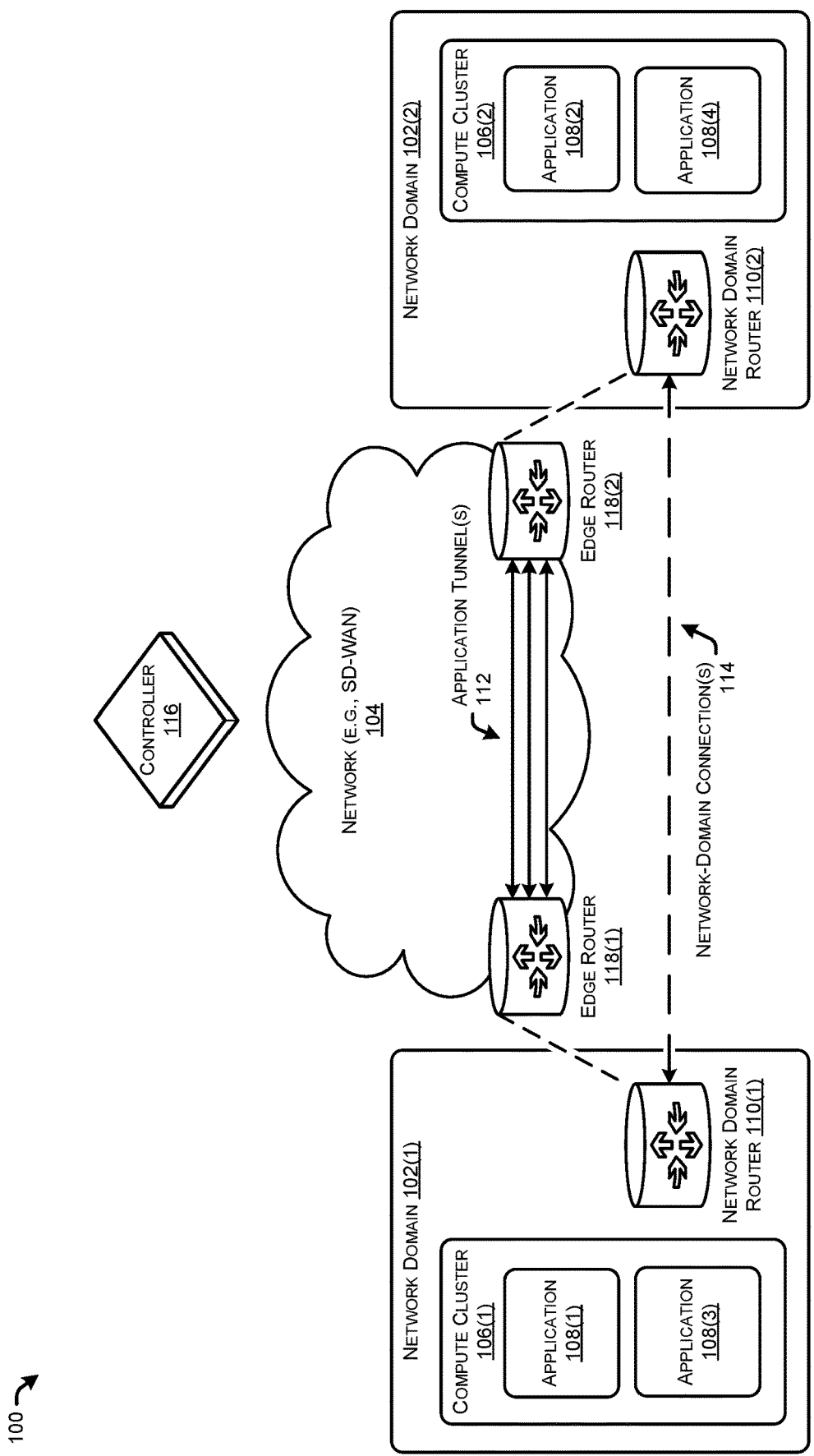
FIG. 1 illustrates an example architecture that may implement various aspects of the technologies described herein.

This disclosure describes various technologies for, among other things, informing a network of an application's requirements expressed as a network service-level objective, so that the network can ensure the requested service-level objective is met end-to-end, thereby allowing core network support and offer deterministic service-levels and application-based routing without using network-based application recognition (NBAR) and/or compromising user privacy. By way of example, and not limitation, the techniques described herein may include receiving an initial connection request to establish, on behalf of an application, a network-domain connection between a source network domain and a destination network domain. The initial connection request may include a service-level objective request. This initial connection may be called a network domain connection. In some examples, aspects of the techniques described herein may be performed by a controller associated with a software-defined wide area network (SD-WAN) that is disposed between the source network domain and the destination network domain. In some examples, the techniques may also include receiving a subsequent connectivity request to establish, on behalf of the source application, a virtual tunnel between the source application and the destination application, the source application disposed in the source network domain and the destination application disposed in the destination network domain. The techniques may also include establishing the virtual tunnel between the source application and the destination application utilizing the network-domain connection such that traffic sent between the source application and the destination application meets the requested SLO requirements utilizing the SLA guarantee provided by the network domain connection.

Additionally, the techniques described herein may be performed as a method and/or by a system having non-transitory computer-readable media storing computer-executable instructions that, when executed by one or more processors, performs the techniques described above and herein.

EXAMPLE EMBODIMENTS

As noted above, modern applications deployed by enterprise IT typically have access requirements of external websites, internal services hosted in a different geographical location, and/or other software as a service (SaaS) applications. As such, network operations teams usually try to optimally configure internal and external networks so that the network can meet application service-level agreement (SLA) objectives. In today's software-defined wide area network (SD-WAN) deployments, this is typically done using, for instance, traffic-profile and/or destination-based optimization techniques.

Traffic-profile based optimization techniques usually include operations of (i) recognizing an application group or application type from application packets, protocol headers, and/or metadata (e.g., Realtime Transport Protocol (RTP) for audio/video conferencing, HTTP Live Streaming (HLS) headers for HTTP-based streaming, etc.), (ii) applying preconfigured policies to packets belonging to a certain application traffic profile, and (iii) optimizing routing for those packets. With encryption in the session layer, however, it has become increasingly difficult to detect application types. For example, with HTTPS (which is now used extensively across enterprise and internet), the header, URL, and transport packets can all be encrypted. Thus, it is difficult to accurately recognize a traffic-profile when HTTPS is used for communication. As such, the network is, increasingly, unable to optimize traffic using traffic-profile based optimization techniques.

In the case of destination-based optimizations, these techniques usually include operations of (i) extracting destination information from L4/L7 protocol headers, and (ii) applying traffic policies and optimizing routing for the extracted destination. Destination fully qualified domain names and/or IP addresses can still be identified from L3/L4 packets. However, Encrypted Server Name Identification (ESNI) adoption is growing for privacy reasons and, with ESNI, the network would fail to see the destination domain specified in the request. In turn, the network would fail to optimize routing based on destination domain name and/or type.

As noted above, because these optimization techniques do not allow applications to communicate their SLA objective(s) to the network, these optimization techniques can only do non-deterministic, best-effort optimization, and there is no way for network behavior (loss, latency, etc.) to be mapped to application behavior (performance). Accordingly, this application is directed to techniques for informing a network (e.g., SD-WAN) of an application's SLA objective(s) so that the network can ensure the SLA is met end-to-end, thereby allowing core network support of deterministic SLA and application-based routing without using network-based application recognition (NBAR) and/or compromising user privacy. In some examples, the techniques disclosed herein may be used to create application-mapped tunnels (or "application tunnels") using core network infrastructure, and an application tunnel can be mapped to one application, a group of applications, an application compute cluster, or the like. In other words, the techniques disclosed herein may create an independent network-domain connection, application connection, and application connection mapping to specific network-domain connections. Because the techniques disclosed herein allow for an application to be mapped to a tunnel, the application's network SLA requirements can be met by provisioning an SLA-bound connection on which the overlay (tunnel) is run. In this way, a network controller can optionally provision SLA-defined underlays for a specific application and guarantee SLA objective(s) are met by leveraging infrastructure provided by an underlay provider. These mappings can help to better understand application failures in the context of network events.

By way of example, and not limitation, a method according to the techniques disclosed herein may include receiving an initial connectivity request to establish, on behalf of an application, a network-domain connection between a source network domain and a destination network domain. In some examples, the initial connection request may include an SLA objective for the network-domain connection. In some examples, an administrator (e.g., Platform Ops admin, DevOps admin, NetOps admin, etc.) may request the connectivity across the two networking domains on behalf of the application. In some examples, a networking domain as used herein may include a virtual private cloud (VPC), a virtual routing and forwarding (VRF) instance, a virtual local area network (VLAN), or the like, which may be present in an on-premises, edge, co-located, and/or cloud provider's network. In some examples, the connectivity request may include SLA requirement(s)/objective(s) embedded in it. Such service level objective(s) requests may include elements such as, but not limited to, a minimum and/or maximum bandwidth, a minimum and/or maximum jitter, a minimum and/or maximum loss, a minimum and/or maximum latency, and/or the like. For instance, a service level object may be that a flow is to maintain a minimum of 1 gigabits per second (Gbps) of bandwidth, that the latency is to be below a maximum of 10 milliseconds (ms), and that packet loss is to be less than 2-percent. In some examples, one or more such connection requests may be received (e.g., from a user or form multiple different users) to connect various networking domains. In some instances, this could result in multiple network-domain connections connecting the same pair of network domains. That is, in some examples there could be multiple (inter) network-domain connections across the same pair of networking domains.

In some examples, the method may include establishing, between the source network domain and the destination network domain, the network-domain connection having a service-level that meets or exceeds the service-level requirement. In some examples, connecting network domains may involve respectively attaching both network domains to respective routers closest to them and creating a tunnel between the routers. These tunnels may, in some instances, be based on internet protocol security (IPSec)/generic routing encapsulation (GRE), or some other encryption protocol. In some examples, the network controller may decide the best tunneling mechanism based on policy configured by, for instance, a network admin. In some examples, the network-domain connection can be created by the application (e.g., by a DevOps admin, PlatformOps admin, etc.) and/or by a NetOps admin. No matter who creates the connection, the application (or a DevOps admin) may list the network-domain connections available and request mapping application traffic over a specific network-domain connection.

In some examples, these network-domain connections may rely on a dedicated tunnel underneath with a unique IPV4, or IPV6 pair. Additionally, in some instances, these network domain connections may also be identified by virtual tunnels that use unique pairs of sub interfaces but the same IPV4/IPV6 pair. With a unique IPV4/IPV6 pair, the routing for each tunnel could be different.

In some examples, an underlay connectivity provider could be a service provider (e.g., AT&T, Verizon, Comcast, etc.) providing first mile connectivity, or a middle mile connectivity provider (e.g., Megaport, Equinix, Packet Fabric, etc.). In some examples, an underlay connectivity provider application programming interface (API) may be invoked to provision SLA guaranteed tunnel(s) that match with the SLA objective(s) expressed in the original connectivity request. In some examples, the network-domain connection may be treated as an independent resource and a user, based on the privilege(s) they have, can do CRUD (Create, Read, Update, and Delete) on the connection. In some instances, a DevOps user may list all available network-domain connections and understand connection properties (e.g., network characteristics) of all the connections.

A network-domain connection across the a pair of networking domains can be identified by a unique identifier. For instance, the network controller may associate a unique identifier with each network-domain connection that it establishes.

In some examples, the method may also include receiving a subsequent connection request to establish, on behalf of the source application, a tunnel between the source application and a destination application, the source application disposed in the source network domain and the destination application disposed in the destination network domain. For instance, a DevOps user, while requesting connectivity from the source application to the destination application (or application components spread across networking domains), may refer to one of the listed network-domain connections that meets the SLA objective(s) of application connectivity. In some examples, both the network-domain connection request and the application tunnel connection request to the network controller may be made using techniques described in U.S. patent application Ser. No. 17/900,020, entitled "Standardized Interface for Wide Area Network Programming," and filed on Aug. 31, 2022, which is incorporated herein by reference in its entirety and for all purposes. In examples where application connection request (e.g., second connection request) uses connectivity provided by a network domain connection, the request may contain source and/or destination subnet prefix and/or IP address of the destination, along with the network-domain connection reference.

In some examples, the tunnel may be an application tunnel created by the application (e.g., for itself) or for the application (e.g., by another entity). In some instances, one application's (or a group of applications') traffic can be routed over such an application tunnel. In some examples, an SLA-guaranteed connection could exist in all three legs of the underlay, such as the first mile, middle mile, and last mile. In many cases, the middle mile SLA guarantee may be enough since that is where significant packet losses happen.

In some examples, the method may include establishing the tunnel between the source application and the destination application utilizing the network-domain connection such that traffic sent between the source application and the destination application is handled according to the service-level requirement. For instance, upon receiving the connectivity request, the network controller may program the network device(s) that hold the real connection (mapped to the network-domain connection). In some examples, device routing configuration may be updated by the DevOps provided source and destination subnet prefixes (which may be included in the subsequent connection request) with the preferred network-domain connection (and derived physical connection between the routers). In some examples, to preserve cluster network (e.g., subnet) IP visibility in the network devices, and to do application-based routing, source network address translation (NAT) may need to be disabled in the cluster router. In some examples, a cluster router may be the default gateway for the application. Additionally, or alternatively, it may be a virtual router running in the application domain itself.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may implement various aspects of the technologies described herein. The architecture 100 includes different network domains 102(1) and 102(2) (hereinafter referred to collectively as "network domains 102") and a network 104 that is disposed between the different network domains 102.

In some examples, the network domains 102 may be virtual private clouds (VPCs), virtual routing and forwarding (VRF) instances, virtual local area networks (VLAN), or the like, which may be present in an on-premises, edge, co-located, and/or cloud provider's network. Each of the network domains 102 may, in some examples, include a respective compute cluster, such as the compute clusters 106(1) and 106(2) (hereinafter referred to collectively as "compute clusters 106"). The compute clusters 106 may be running various applications 108(1)-108(4) (hereinafter referred to collectively as "applications 108") and/or services associated with the applications. In examples, the network domains 102 may also include a respective network domain router, such as the network domain routers 110(1) and 110(2) (hereinafter referred to collectively as "network domain routers 110").

According to the techniques disclosed herein, a controller 116 of the network 104 (e.g., an SD-WAN) may be informed of SLA objective(s) of one or more of the applications 108, and the network 104 may establish various connections and/or tunnels to ensure the SLA objective(s) is/are met end-to-end (e.g., between the different network domains 102), thereby allowing core network support of deterministic SLA and application-based routing without using network-based application recognition (NBAR) and/or compromising user privacy. In some examples, the techniques disclosed herein may be used by the controller 116 to create application-mapped tunnels, such as the application tunnel(s) 112 using core network infrastructure, and an application tunnel 112 can be mapped to one application (e.g., application 108(1)), a group of applications (e.g., application 108(1) and application 108(2), an application compute cluster (e.g., compute cluster 106(1)), and/or the like. In examples, the techniques disclosed herein may create independent network-domain connection(s) 114, application tunnel(s) 112, and application tunnel 112 mapping to specific network-domain connection(s) 114. Because the techniques disclosed herein allow for an application 108 to be mapped to application tunnel(s) 112, the application's network SLA objective(s) can be met by provisioning SLA-bound network-domain connection(s) 114 on which the overlay (application tunnel 112) is run. In this way, a network controller associated with the network 104 can, optionally, provision SLA-defined underlays for a specific application 108 and guarantee SLA objective(s) are met by leveraging infrastructure provided by an underlay provider. These mappings can help to better understand application failures in the context of network events.

In some examples, the controller 116 may receive a network-domain connectivity request to establish, on behalf of an application 108, the network-domain connection(s) 114 between the network domain 102(1) and the network domain 102(2). In some examples, the network-domain connectivity request may include SLA objective(s) for the network-domain connection(s) 114. In some examples, an administrator (e.g., Platform Ops admin, DevOps admin, NetOps admin, etc.) may request the connectivity across the two networking domains 102 on behalf of the application 108. In some examples, SLA objective(s) included in the network-domain connectivity request may include elements such as, but not limited to, minimum and/or maximum bandwidth objectives, minimum and/or maximum jitter objectives, minimum and/or maximum packet loss objectives, security objectives, minimum and/or maximum latency objectives, etc. In some examples, one or more such connectivity requests may be received by the controller 116 (e.g., from a user or from multiple different users) to connect various different networking domains 102. In some instances, this could result in multiple network-domain connection(s) 114 connecting the same pair of network domains 102, as well as different network domains (e.g., network domains not shown in FIG. 1). That is, in some examples there could be multiple (inter) network-domain connection(s) 114 across the same pair of network domains 102.

In examples, the controller 116 may establish the network-domain connection(s) 114 having service-levels that meets or exceeds the service-level objective(s). In some examples, establishing the network-domain connection(s)

114 may involve respectively attaching, by the controller 116, both network domains 102 to respective routers (e.g., network domain routers 110) closest to them and creating a tunnel between the routers. These tunnels may, in some instances, be based on internet protocol security (IPSec)/ generic routing encapsulation (GRE), or some other encryption protocol. In examples, the network controller 116 may decide the best tunneling mechanism based on policy configured by, for instance, a NetOps admin. In some examples, the network-domain connection(s) 114 can be created by the applications 108 (e.g., by a DevOps admin, PlatformOps admin, etc.) and/or by a NetOps admin. No matter who creates the connection, the application (or the DevOps admin) may list the network-domain connection(s) 114 available and request mapping application traffic over a specific network-domain connection 114.

In some examples, these network-domain connection(s) 114 may have a tunnel underneath with a unique IPV4, or IPV6 pair. Additionally, in some instances, these connections may also be identified by virtual tunnels that use unique pairs of sub interfaces but the same IPV4/IPV6 pair. With a unique IPV4/IPV6 pair, the routing for each tunnel could be different.

In some examples, an underlay connectivity provider between the network domains 102 could be a service provider (e.g., AT&T, Verizon, Comcast, etc.) providing first mile connectivity, a middle mile connectivity provider (e.g., Megaport, Equinix, Packet Fabric, etc.), or the like. In some examples, the underlay connectivity provider's application programming interface (API) may be invoked to provision SLA guaranteed tunnel(s) that match with the SLA objective(s) expressed in the original network-domain connectivity request. In some examples, the network-domain connection(s) 114 may be treated as independent resources and a user, based on the privilege(s) they have, can do CRUD (Create, Read, Update, and Delete) on the connection(s). In some instances, a DevOps user may list all available network-domain connection(s) 114 and understand connection properties (e.g., network characteristics) of all the connections. In some examples, each of the network-domain connection(s) 114 across the same pair of networking domains can be identified by a unique identifier. For instance, the network controller 116 may associate a unique identifier with each network-domain connection 114 that it establishes.

In some examples, the controller 116 may also receive application connectivity request(s) to establish, on behalf of the applications 108, the application tunnel(s) 112 between the different applications 108 disposed in the different network domains 102. For instance, a DevOps user, while requesting connectivity from the application 108(1) to the application 108(3) (or application components spread across networking domains), may refer to one of the listed network-domain connection(s) 114 that meets the SLA objective(s) of application connectivity. In some examples, both the network-domain connection request and the application tunnel connection request to the network controller may be made using techniques described in U.S. patent application Ser. No. 17/900,020, entitled "Standardized Interface for Wide Area Network Programming," and filed on Aug. 31, 2022, which is incorporated herein by reference in its entirety and for all purposes. In some examples, the application connection request to the network 104 and/or controller 116 may contain source and/or destination subnet prefix and/or IP address, along with a reference to the network-domain connection(s) 114 to be used (e.g., an identifier included in the request).

In some examples, creation of the application tunnel(s) 112 may be initiated by the applications 108 (e.g., for themselves) or for the applications 108 (e.g., by a user or another entity). In some instances, one application's (or a group of applications') traffic can be routed over these application tunnel(s) 112. In some examples, an SLA-guaranteed connection could exist in all three legs of the underlay, such as the first mile, middle mile, and last mile. In many cases, the middle mile SLA guarantee may be enough since that is where significant packet losses happen.

In some examples, the network 104 and/or controller 116 may establish the application tunnel(s) 112 between the applications 108 utilizing the network-domain connection(s) 114 such that traffic sent between the different applications 108 is handled according to the service-level objective(s). In some examples, the application tunnel(s) 112 may be established between edge routers 118(1) and 118(2) of the network 104. In some examples, upon receiving the application connectivity request, the network controller 116 may program the network device(s) (e.g., edge routers 118) that hold the real connection (mapped to the network-domain connection). In some examples, device routing configuration may be updated by the DevOps-provided source and destination subnet prefixes (which may be included in the application connectivity request) with the preferred network-domain connection(s) 114 (and derived physical connection between the routers).

Figure 2:
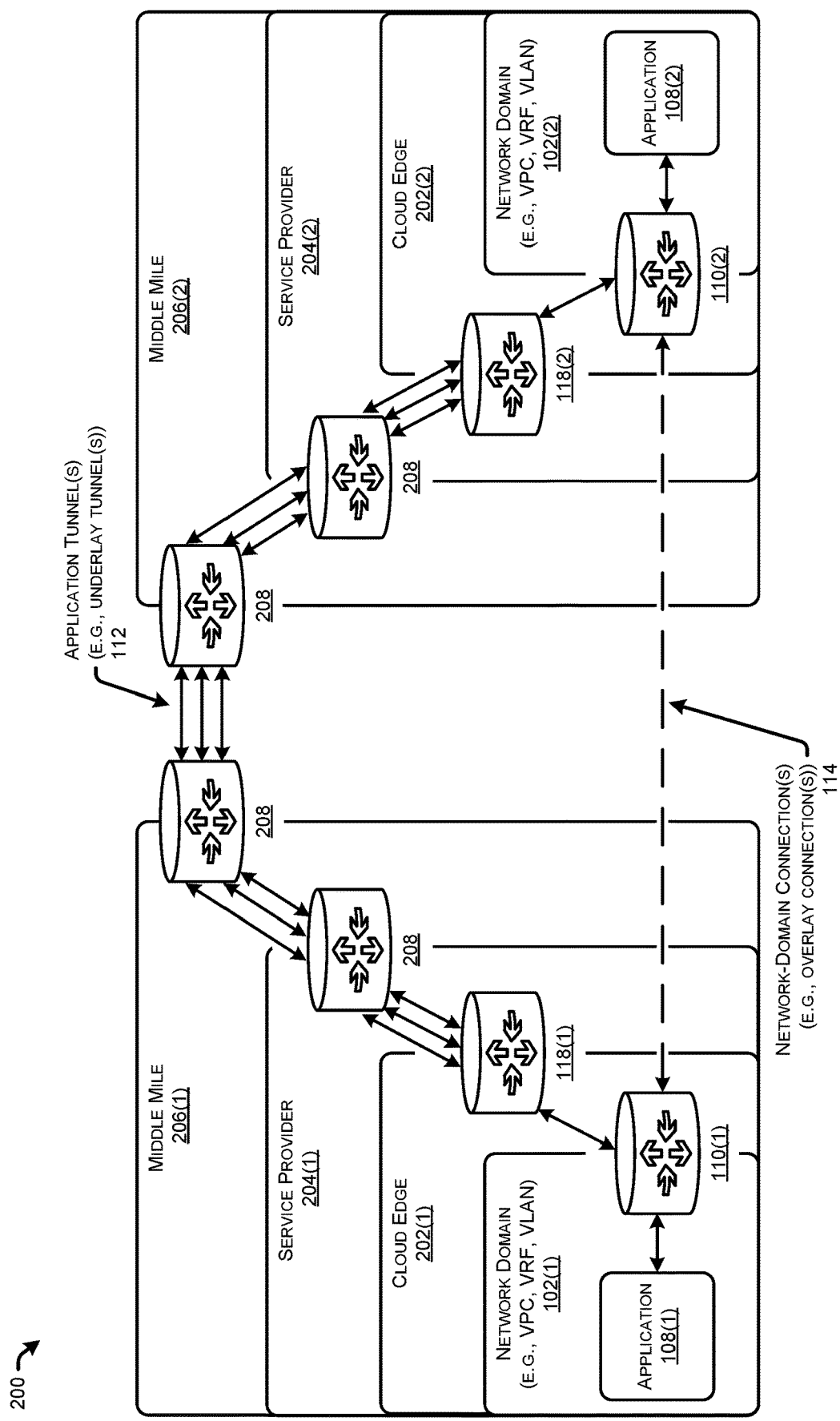
FIG. 2 illustrates an example underlay transport network hierarchy that may be disposed between different network domains.

FIG. 2 illustrates an example underlay transport network hierarchy 200 that may be disposed between the different network domains 102. For instance, a cloud edge 202 domain, a service provider 204 domain, and a middle mile 206 domain may be disposed between the different network domains 102. In other words, traffic that is to be sent from the application 108(1) to the application 108(2) passes through the cloud edge 202, service provider 204, and middle mile 206, as well as their respective networking devices 208 (e.g., routers). In examples, the different network-domain connection(s) 114 may be mapped to different application tunnel(s) 112 through the underlay based on SLA objective(s) associated with the application.

Figure 3:
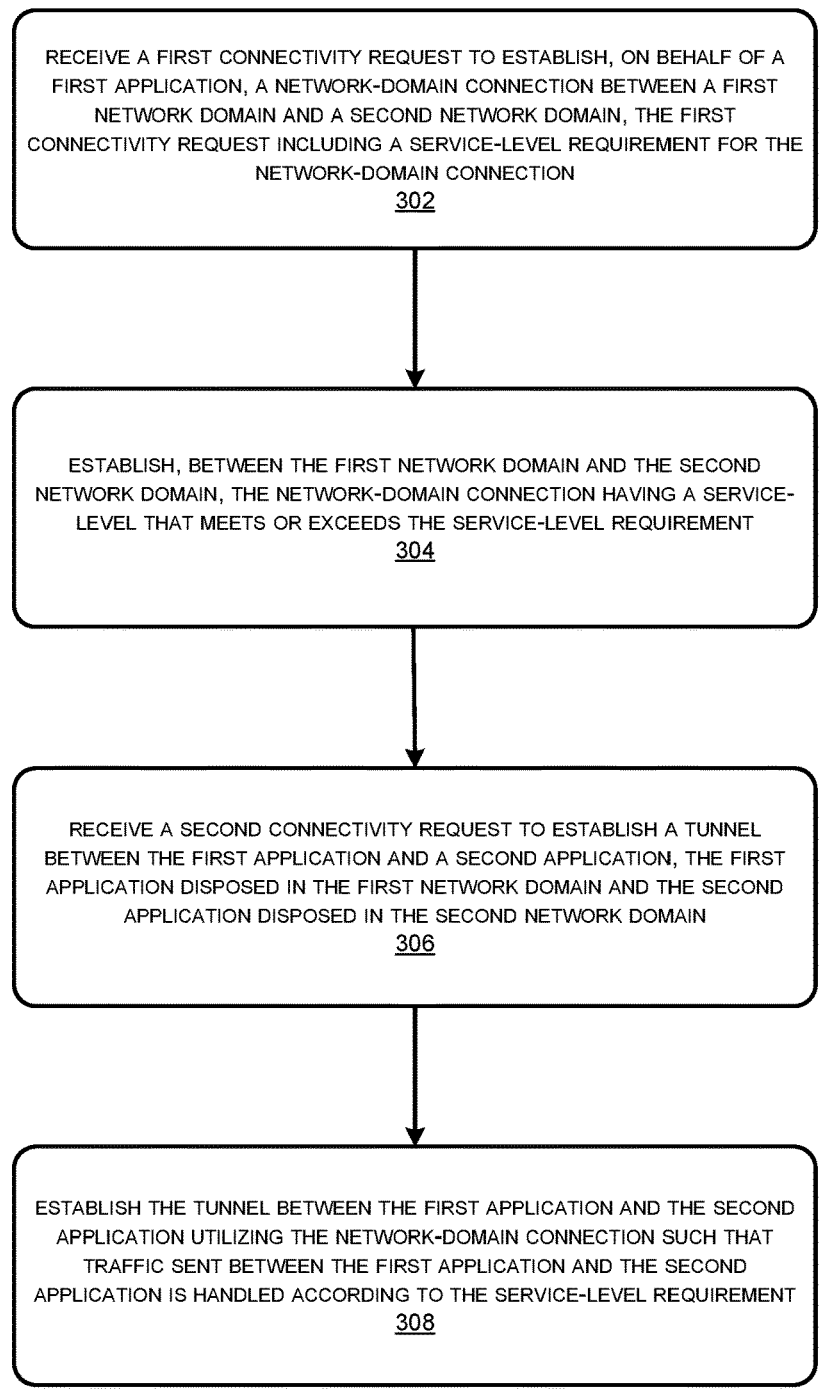
FIG. 3 is a flow diagram illustrating an example method associated with the techniques described herein.

FIG. 3 is a flow diagram illustrating an example method 300 associated with the techniques described herein. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 300 begins at operation 302, which includes receiving a first connectivity request to establish, on behalf of a first application, a network-domain connection between a first network domain and a second network domain, the first connectivity request including a service-level requirement for the network-domain connection. For instance, the controller 116 may receive the first connectivity request to establish, an behalf of a first application 108(1) a network-domain connection 114 between the first network domain 102(1) and the second network domain 102(2). In some examples, the first connectivity request may include SLA objective(s) for the network-domain connection(s) 114. In some examples, an administrator (e.g., Platform Ops admin, DevOps admin, NetOps admin, etc.) may send the connectivity request on behalf of the application 108. In some examples, SLA objective(s) included in the network-domain connectivity request may include elements such as, but not limited to, bandwidth objectives, jitter objectives, loss objectives, security objectives, and/or latency objectives At operation 304, the method 300 includes establishing, between the first network domain and the second network domain, the network-domain connection having a service-level that meets or exceeds the service-level requirement. For instance, the controller 116 may establish the network-domain connection 114 between the first network domain 102(1) and the second network domain 102(2) having the service-level that meets or exceeds the service-level requirement/objective. In some examples, establishing the network-domain connection may involve respectively attaching, by the controller, both network domains to respective routers (e.g., network domain routers 110) closest to them and creating a tunnel between the routers. These tunnels may, in some instances, be based on internet protocol security (IPSec)/generic routing encapsulation (GRE), or some other encryption protocol. In examples, the network controller may decide the best tunneling mechanism based on policy configured by, for instance, a NetOps admin. In some examples, the network-domain connection can be created by the applications (e.g., by a DevOps admin, PlatformOps admin, etc.) and/or by a NetOps admin. No matter who creates the connection, the application (or the DevOps admin) may list the network-domain connection(s) available and request mapping application traffic over a specific network-domain connection.

At operation 306, the method 300 includes receiving a second connectivity request to establish a tunnel (e.g., application tunnel) between the first application and a second application, the first application disposed in the first network domain and the second application disposed in the second network domain. For instance, the controller 116 may receive the second connectivity request to establish an application tunnel 112 between the first application 108(1) and the second application 108(2). In some examples, a DevOps user, while requesting connectivity from the first application to the second application (or application components spread across networking domains), may refer to one of the listed network-domain connection(s) that meets the SLA objective(s) of application connectivity. In some examples, the application connection request to the network 104 and/or controller 116 may contain source and/or destination subnet prefix and/or IP address, along with a reference to the network-domain connection(s) 114 to be used (e.g., an identifier included in the request). In some examples, creation of the application tunnel may be initiated by the applications (e.g., for themselves) or for the applications (e.g., by a user or another entity). In some instances, one application's (or a group of applications') traffic can be routed over the application tunnel. In some examples, an SLA-guaranteed connection could exist in all three legs of the underlay, such as the first mile, middle mile, and last mile.

At operation 308, the method 300 includes establishing the tunnel between the first application and the second application utilizing the network-domain connection such that traffic sent between the first application and the second application is handled according to the service-level requirement. For instance, the controller 116 may establish the application tunnel 112 between the first application 108(1) and the second application 108(2) utilizing the network-domain connection 114. To establish the connection, in some examples, the network controller 116 may program the network device(s) that hold the real connection (mapped to the network-domain connection). In some examples, device routing configuration may be updated by the DeVops-provided source and destination subnet prefixes (which may be included in the application connectivity request) with the preferred network-domain connection(s) 114 (and derived physical connection between the routers).

Figure 4:
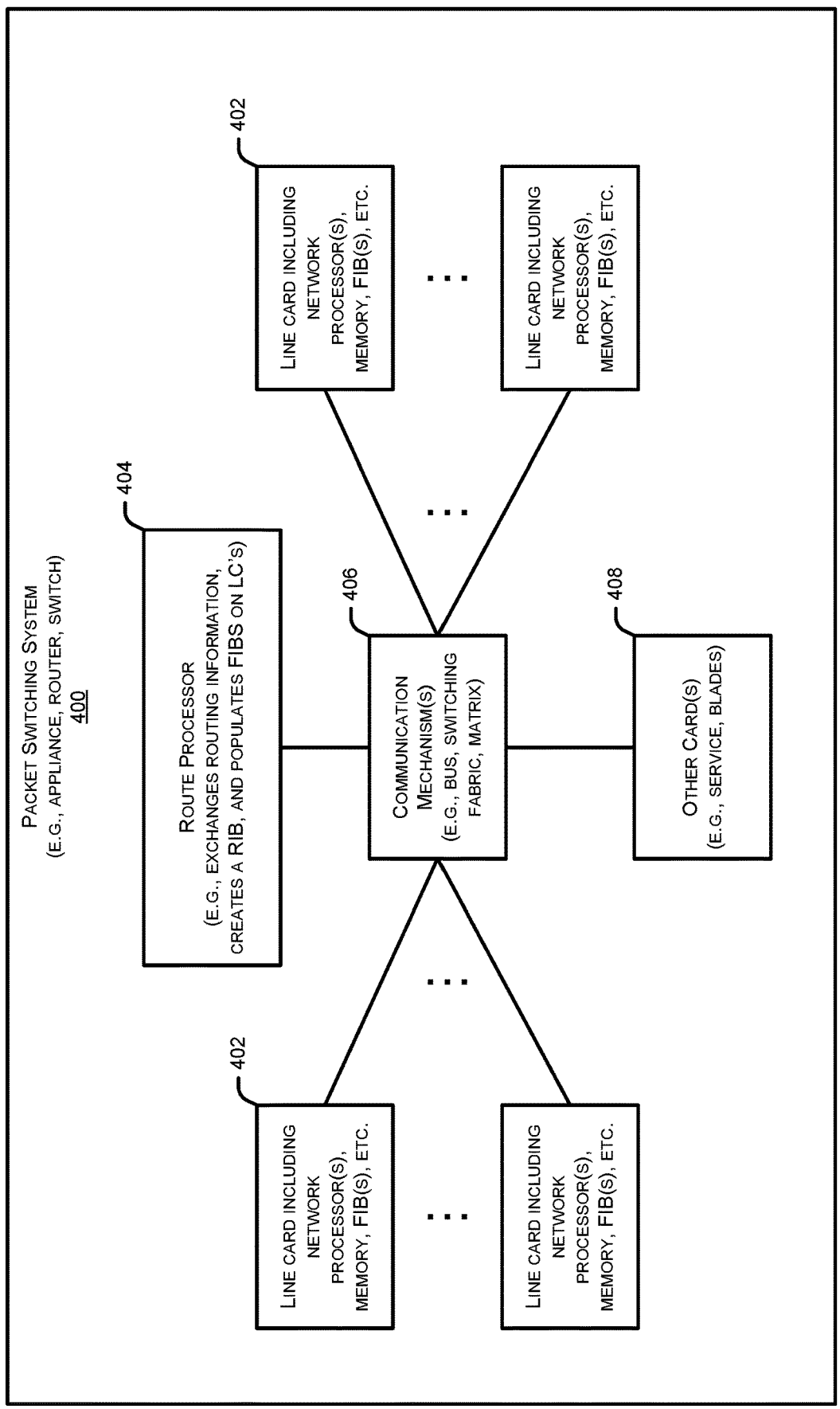
FIG. 4 is a block diagram illustrating an example packet switching system that can be utilized to implement various aspects of the technologies disclosed herein.

FIG. 4 is a block diagram illustrating an example packet switching device 400 (or packet switching system) that can be utilized to implement various aspects of the technologies disclosed herein. In some examples, packet switching device(s) 400 may be employed in various networks and architectures, such as, for example, the network domains 102, the network 104, and the architectures 100 and 200 as described with respect to FIGS. 1-2.

In some examples, a packet switching device 400 may comprise multiple line card(s) 402, each with one or more network interfaces for sending and receiving packets over communications links (e.g., possibly part of a link aggregation group). The packet switching device 400 may also have a control plane with one or more processing elements (e.g., route processor 404) for managing the control plane and/or control plane processing of packets associated with forwarding of packets in a network. The packet switching device 400 may also include other cards 408 (e.g., service cards, blades) which include processing elements that are used to process (e.g., forward/send, drop, manipulate, change, modify, receive, create, duplicate, apply a service) packets associated with forwarding of packets in a network. The packet switching device 400 may include hardware-based communication mechanism(s) 406 (e.g., bus, switching fabric, and/or matrix, etc.) for allowing its different entities to communicate. The line card(s) 402 may typically perform the actions of being both an ingress and/or an egress line card 402 in regard to multiple other particular packets and/or packet streams being received by, or sent from, packet switching device 400.

Figure 5:
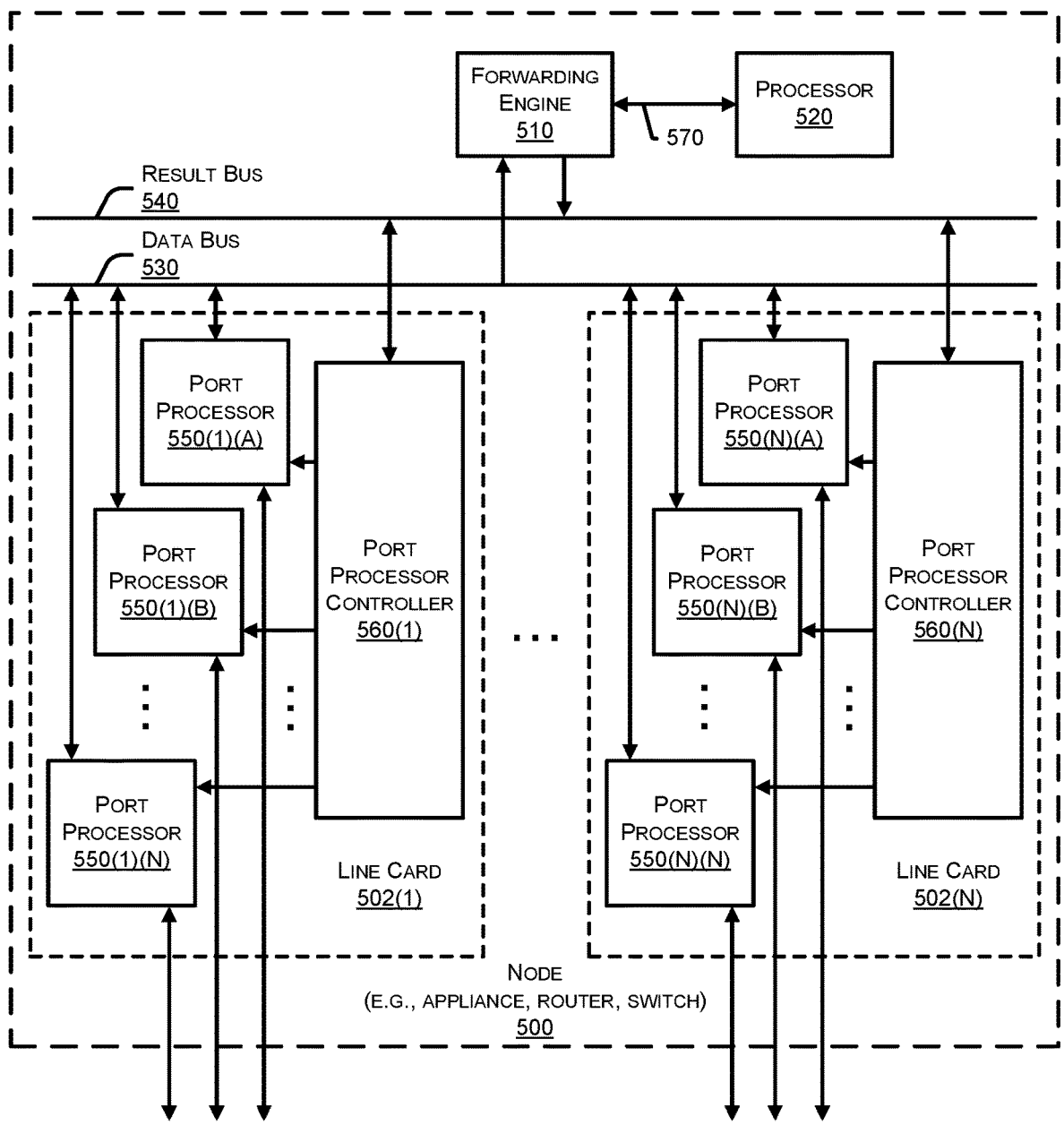
FIG. 5 is a block diagram illustrating certain components of an example node that can be utilized to implement various aspects of the technologies disclosed herein.

FIG. 5 is a block diagram illustrating certain components of an example node 500 that can be utilized to implement various aspects of the technologies disclosed herein. In some examples, node(s) 500 may be employed in various architectures and networks, such as, for example, the network domains 102, the network 104, and the architectures 100 and 200 as described with respect to FIGS. 1-2.

In some examples, node 500 may include any number of line cards 502 (e.g., line cards 502(1)-(N), where N may be any integer greater than 1) that are communicatively coupled to a forwarding engine 510 (also referred to as a packet forwarder) and/or a processor 520 via a data bus 530 and/or a result bus 540. Line cards 502(1)-(N) may include any number of port processors 550(1)(A)-(N)(N) which are controlled by port processor controllers 560(1)-(N), where N may be any integer greater than 1. Additionally, or alternatively, forwarding engine 510 and/or processor 520 are not only coupled to one another via the data bus 530 and the result bus 540, but may also communicatively coupled to one another by a communications link 570.

The processors (e.g., the port processor(s) 550 and/or the port processor controller(s) 560) of each line card 502 may be mounted on a single printed circuit board. When a packet or packet and header are received, the packet or packet and header may be identified and analyzed by node 500 (also referred to herein as a router) in the following manner. Upon receipt, a packet (or some or all of its control information) or packet and header may be sent from one of port processor(s) 550(1)(A)-(N)(N) at which the packet or packet and header was received and to one or more of those devices coupled to the data bus 530 (e.g., others of the port processor(s) 550(1)(A)-(N)(N), the forwarding engine 510 and/or the processor 520). Handling of the packet or packet and header may be determined, for example, by the forwarding engine 510. For example, the forwarding engine 510 may determine that the packet or packet and header should be forwarded to one or more of port processors 550(1)(A)-(N)(N). This may be accomplished by indicating to corresponding one(s) of port processor controllers 560 (1)-(N) that the copy of the packet or packet and header held in the given one(s) of port processor(s) 550(1)(A)-(N)(N) should be forwarded to the appropriate one of port processor(s) 550(1)(A)-(N)(N). Additionally, or alternatively, once a packet or packet and header has been identified for processing, the forwarding engine 510, the processor 520, and/or the like may be used to process the packet or packet and header in some manner and/or maty add packet security information in order to secure the packet. On a node 500 sourcing such a packet or packet and header, this processing may include, for example, encryption of some or all of the packet's and/or header's information, the addition of a digital signature, and/or some other information and/or processing capable of securing the packet or packet and header. On a node 500 receiving such a processed packet or packet and header, the corresponding process may be performed to recover or validate the packet's and/or header's information that has been secured.

Figure 6:
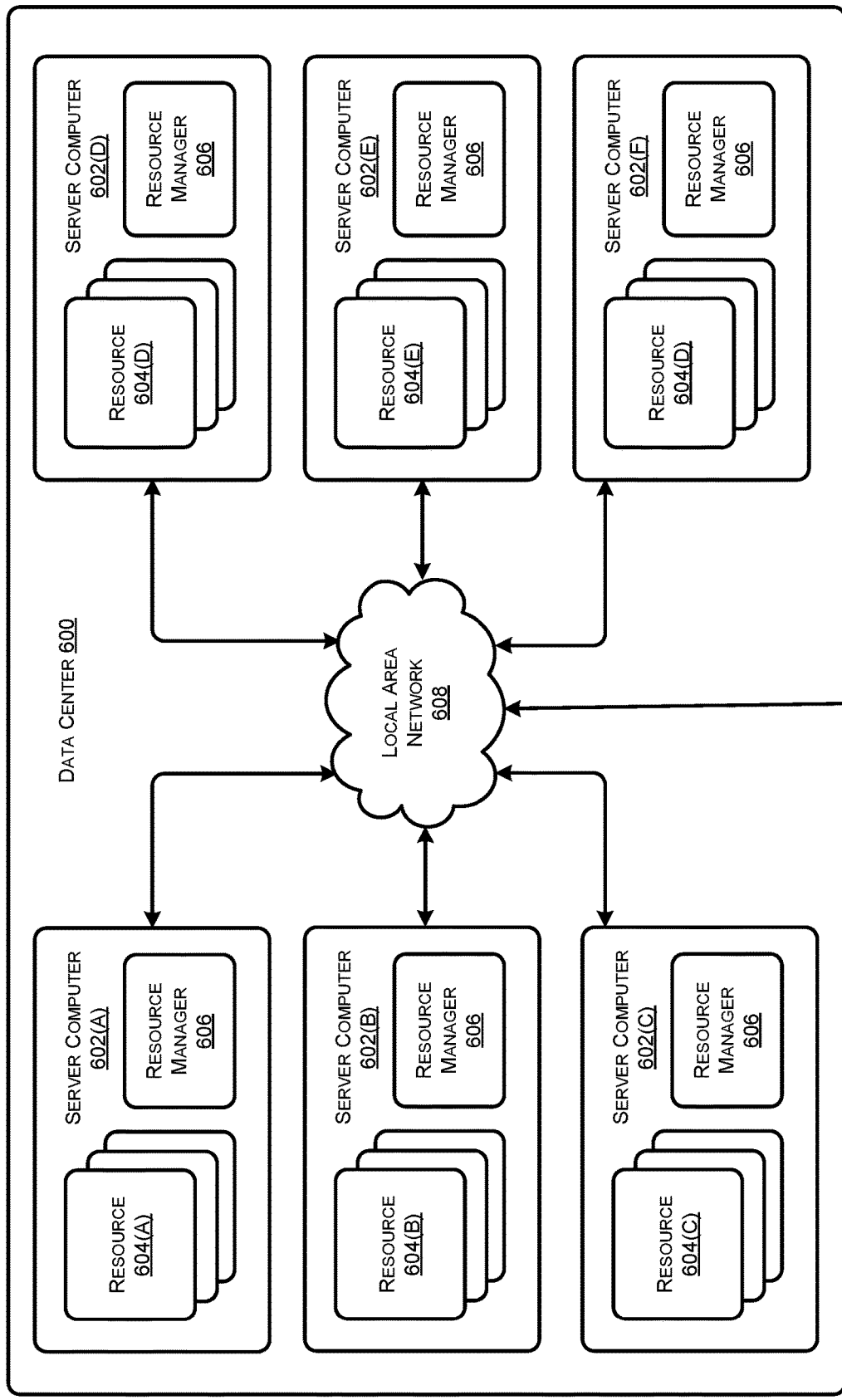
FIG. 6 is a computing system diagram illustrating an example configuration of a data center that can be utilized to implement aspects of the technologies disclosed herein.

FIG. 6 is a computing system diagram illustrating an example configuration of a data center 600 that can be utilized to implement aspects of the technologies disclosed herein. The example data center 600 shown in FIG. 6 includes several server computers 602A-602F (which might be referred to herein singularly as "a server computer 602" or in the plural as "the server computers 602") for providing computing resources. In some examples, the resources and/or server computers 602 may include, or correspond to, the any type of networked device described herein. Although described as servers, the server computers 602 may comprise any type of networked device, such as servers, switches, routers, hubs, bridges, gateways, modems, repeaters, access points, proxies, etc.

In some examples, the data center 600 may correspond with one of the network domains 102. As such, in some examples, the server computers 602 may correspond with the compute clusters 106, and the resources 604 may correspond with the applications 108.

The server computers 602 can be standard tower, rackmount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, VPNs, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 (local area network) is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers, between each of the server computers 602A-602F in each data center 600, and, potentially, between computing resources in each of the server computers 602. It should be appreciated that the configuration of the data center 600 described with reference to FIG. 6 is merely illustrative and that other implementations can be utilized. In some examples, a proxy 102 as described herein may be disposed in the data center 600.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like tenant containers and VM instances, data storage resources, networking resources, data communication resources, network services, VPN instances, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
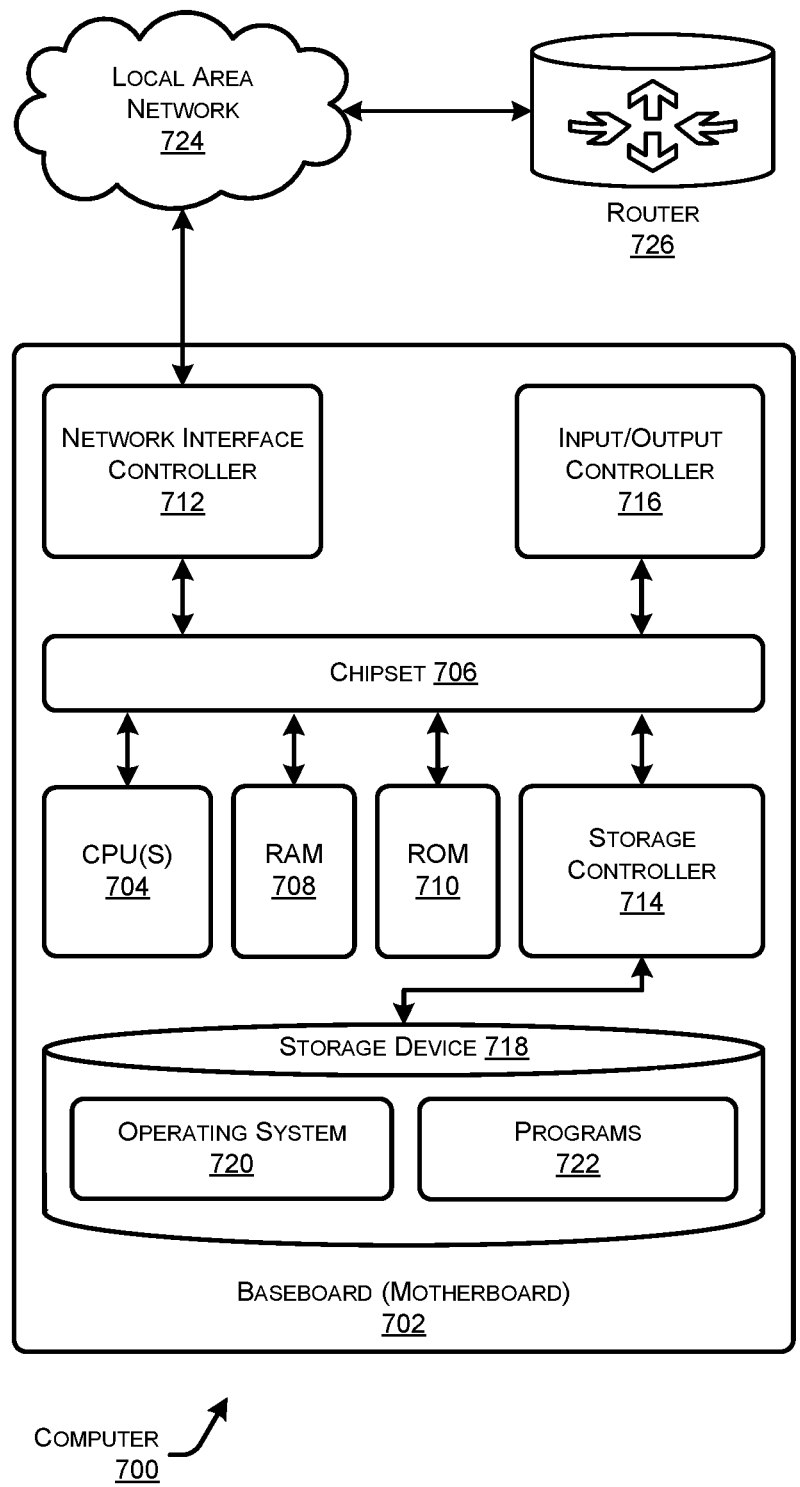
FIG. 7 is a computer architecture diagram showing an illustrative computer hardware architecture for implementing a computing device that can be utilized to implement aspects of the various technologies presented herein.

FIG. 7 is a computer architecture diagram showing an illustrative computer hardware architecture for implementing a computing device that can be utilized to implement aspects of the various technologies presented herein. The computer architecture shown in FIG. 7 illustrates a conventional server computer, network device, controller, workstation, desktop computer, laptop, tablet, network appliance, e-reader, smartphone, load balancer, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network. The chipset 706 can include functionality for providing network connectivity through a NIC 712, such as a gigabit Ethernet adapter. The NIC 712 is capable of connecting the computer 700 to other computing devices over the network 724, such as a router 726, which may correspond with any of the network domain routers 110, edge routers 118, or networking devices 208 described herein. It should be appreciated that multiple NICs 712 can be present in the computer 700, connecting the computer to other types of networks and remote computer systems. In some examples, the NIC 712 may be configured to perform at least some of the techniques described herein.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the architectures 100 and/or 200 and/or any components included therein, may be supported by one or more devices similar to computer 700. Stated otherwise, some or all of the operations performed by the architectures 100 and/or 200, and/or any components included therein, may be performed by one or more computer devices 700 operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants.

It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes and functionality described above with regard to FIGS. 1-6, and herein. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

The computer 700 may include one or more hardware processors (processors) configured to execute one or more stored instructions. The processor(s) may comprise one or more cores. Further, the computer 700 may include one or more network interfaces configured to provide communications between the computer 700 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for informing a network of an application's SLA objective(s) so the network can ensure the SLA is met end-to-end, thereby allowing core network support of deterministic SLA and application-based routing without using NBAR and/or compromising user privacy.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partially by a controller associated with a software-defined wide area network (SD-WAN), the method comprising:
   receiving an initial connection request to establish, on behalf of a source application, a network-domain connection between a source network domain and a destination network domain, the initial connection request including a requested network service level agreement (SLA) for the network-domain connection;
   establishing, between the source network domain and the destination network domain, the network-domain connection having a network SLA that meets or exceeds the requested network SLA along a middle mile portion of a network path associated with the network-domain connection, the middle mile portion including one or more underlay transport networks;
   receiving a subsequent connection request to establish, on behalf of the source application, a virtual tunnel between the source application and a destination application, the source application disposed in the source network domain and the destination application disposed in the destination network domain; and
   establishing the virtual tunnel between the source application and the destination application utilizing the network-domain connection such that traffic sent between the source application and the destination application is handled according to the requested network SLA along the middle mile portion of the network path.

2. The method of claim 1, wherein establishing the network-domain connection comprises programming an underlay transport network of the one or more underlay transport networks disposed between the source network domain and the destination network domain with the requested SLA for the network-domain connection.

3. The method of claim 2, wherein the underlay transport network is programmed by the controller via an application programming interface (API) exposed by the underlay transport network.

4. The method of claim 1, wherein the requested network SLA for the network-domain connection includes at least one of:
   a minimum bandwidth objective,
   a maximum jitter objective,
   a maximum loss objective, or
   or a maximum latency objective.

5. The method of claim 1, further comprising associating a unique identifier with the network-domain connection, wherein establishing the virtual tunnel between the source and the destination utilizing the network-domain connection is based at least in part on the subsequent connection request including the unique identifier.

6. The method of claim 1, wherein the subsequent connection request includes at least one of:
   a source subnet prefix or a source internet protocol (IP) address,
   a destination subnet prefix or a destination IP address, and
   a unique identifier associated with the network-domain connection.

7. The method of claim 1, wherein the source network domain and the destination network domain are different virtual private clouds (VPCs), virtual routing and forwarding (VRF) instances, or virtual local area networks (VLANs) present in at least one of an on-premises enterprise network, an edge network, a co-located network, or a cloud provider network.

8. A system associated with a controller of a software-defined wide area network (SD-WAN) disposed between a source network domain and a destination network domain, the system comprising:
  one or more processors; and
  one or more non-transitory computer-readable media storing instructions that, when executed, cause the one or more processors to perform operations comprising:
    receiving an initial connection request to establish, on behalf of a source application, a network-domain connection between the source network domain and the destination network domain, the initial connection request including a requested network service level agreement (SLA) for the network-domain connection;
    establishing, between the source network domain and the destination network domain, the network-domain connection having a network SLA that meets or exceeds the requested network SLA along a middle mile portion of a network path associated with the network-domain connection, the middle mile portion including one or more underlay transport networks;
    receiving a subsequent connection request to establish, on behalf of the source application, a virtual tunnel between the source application and a destination application, the source application disposed in the source network domain and the destination application disposed in the destination network domain; and
    establishing the virtual tunnel between the source application and the destination application utilizing the network-domain connection such that traffic sent between the source application and the destination application is handled according to the requested network SLA along the middle mile portion of the network path.

9. The system of claim 8, wherein establishing the network-domain connection comprises programming an underlay transport network of the one or more underlay transport networks disposed between the source network domain and the destination network domain with the requested SLA for the network-domain connection.

10. The system of claim 9, wherein the underlay transport network is programmed, by the controller, via an application programming interface (API) exposed by the underlay transport network.

11. The system of claim 8, wherein the requested network SLA for the network-domain connection includes at least one of:
  a minimum bandwidth objective,
  a maximum jitter objective,
  a maximum loss objective, or
  or a maximum latency objective.

12. The system of claim 8, the operations further comprising associating a unique identifier with the network-domain connection, wherein establishing the virtual tunnel between the source and the destination utilizing the network-domain connection is based at least in part on the subsequent connection request including the unique identifier.

13. The system of claim 8, wherein the subsequent connection request includes at least one of:
  a source subnet prefix or a source internet protocol (IP) address,
  a destination subnet prefix or a destination IP address, and
  a unique identifier associated with the network-domain connection.

14. The system of claim 8, wherein the source network domain and the destination network domain are different virtual private clouds (VPCs), virtual routing and forwarding (VRF) instances, or virtual local area networks (VLANs) present in at least one of an on-premises enterprise network, an edge network, a co-located network, or a cloud provider network.

15. One or more non-transitory computer-readable media storing instructions that, when executed, cause one or more processors to perform operations comprising:
  receiving an initial connection request to establish, on behalf of a source application, a network-domain connection between a source network domain and a destination network domain, the initial connection request including a requested network service level agreement (SLA) for the network-domain connection;
  establishing, between the source network domain and the destination network domain, the network-domain connection having a network SLA that meets or exceeds the requested network SLA along a middle mile portion of a network path associated with the network-domain connection, the middle mile portion including one or more underlay transport networks;
  receiving a subsequent connection request to establish, on behalf of the source application, a virtual tunnel between the source application and a destination application, the source application disposed in the source network domain and the destination application disposed in the destination network domain; and
  establishing the virtual tunnel between the source application and the destination application utilizing the network-domain connection such that traffic sent between the source application and the destination application is handled according to the requested network SLA along the middle mile portion of the network path.

16. The one or more non-transitory computer-readable media of claim 15, wherein establishing the network-domain connection comprises programming, via an exposed application programming interface (API), an underlay transport network of the one or more underlay transport networks disposed between the source network domain and the destination network domain with the requested network SLA for the network-domain connection.

17. The one or more non-transitory computer-readable media of claim 15, wherein the requested network SLA for the network-domain connection includes at least one of:
  a minimum bandwidth objective,
  a maximum jitter objective,
  a maximum loss objective, or
  or a maximum latency objective.

18. The one or more non-transitory computer-readable media of claim 15, the operations further comprising associating a unique identifier with the network-domain connection, wherein establishing the virtual tunnel between the source and the destination utilizing the network-domain connection is based at least in part on the subsequent connection request including the unique identifier.

19. The one or more non-transitory computer-readable media of claim 15, wherein the subsequent connection request includes at least one of:
  a source subnet prefix or a source internet protocol (IP) address,
  a destination subnet prefix or a destination IP address, and
  a unique identifier associated with the network-domain connection.

20. The one or more non-transitory computer-readable media of claim 15, wherein the source network domain and the destination network domain are different virtual private clouds (VPCs), virtual routing and forwarding (VRF) instances, or virtual local area networks (VLANs) present in at least one of an on-premises enterprise network, an edge network, a co-located network, or a cloud provider network.

\* \* \* \* \*